(12) United States Patent
Bartleywood (10) Patent No.: US 10,116,534 B2
(45) Date of Patent: Oct. 30, 2018

(54) SYSTEMS AND METHODS FOR WEBSPHERE MQ PERFORMANCE METRICS ANALYSIS

(71) Applicant: TxMQ, Inc., Getzville, NY (US)

(72) Inventor: Allan Bartleywood, Buffalo, NY (US)

(*) Notice: Subject to any disclaimer, the term of this patent is extended or adjusted under 35 U.S.C. 154(b) by 88 days.

(21) Appl. No.: 15/235,034

(22) Filed: Aug. 11, 2016

(65) Prior Publication Data

US 2017/0048120 A1    Feb. 16, 2017

Related U.S. Application Data

(60) Provisional application No. 62/203,713, filed on Aug. 11, 2015.

(51) Int. Cl.
| | | |
|---|---|---|
| G06F 15/173 | (2006.01) | |
| H04L 12/26 | (2006.01) | |
| H04L 12/24 | (2006.01) | |
| G06F 11/30 | (2006.01) | |

(52) U.S. Cl.
CPC .............. H04L 43/06 (2013.01); G06F 11/30 (2013.01); H04L 41/14 (2013.01); H04L 41/5009 (2013.01); H04L 41/5077 (2013.01); H04L 43/045 (2013.01); H04L 43/14 (2013.01)

(58) Field of Classification Search
USPC ......................................................... 709/224
See application file for complete search history.

(56) References Cited

U.S. PATENT DOCUMENTS

| | | | | |
|---|---|---|---|---|
| 7,051,098 | B2* | 5/2006 | Masters ................... | G06F 9/06 709/223 |
| 7,082,604 | B2* | 7/2006 | Schneiderman ...... | G06F 9/4862 709/202 |
| 2005/0071838 | A1* | 3/2005 | Hatasaki .................. | G06F 8/64 717/168 |
| 2005/0278270 | A1* | 12/2005 | Carr ....................... | G06Q 10/10 706/25 |
| 2016/0285975 | A1* | 9/2016 | Standley ................. | H04L 67/12 |
| 2017/0048120 | A1* | 2/2017 | Bartleywood .......... | H04L 43/14 |

* cited by examiner

*Primary Examiner* — Michael Y Won
(74) *Attorney, Agent, or Firm* — Hodgson Russ LLP (57) ABSTRACT

Systems and methods for the computer-automated mining and profiling of server monitoring data and related information are disclosed. Performance monitoring is performed through system commands and queries against particular software components arranged in a particular way that provides comparative information for the management and optimization of server and software resources through the identification of constraints and bottlenecks. Further, the present disclosure relates to the analysis and comparison of a current running profile of a server against previous or archived profiles. The profiles characterize the utilization and usage of server resources, or prior systems performance history for the purpose of performance tuning and resource optimization of the middleware messaging software.

8 Claims, 4 Drawing Sheets

SYSTEMS AND METHODS FOR WEBSPHERE MQ PERFORMANCE METRICS ANALYSIS

CROSS-REFERENCE TO RELATED APPLICATIONS

This application claims priority to U.S. Provisional Application No. 62/203,713, filed on Aug. 11, 2015, the disclosure of which is incorporated herein by reference.

FIELD OF THE DISCLOSURE

The present disclosure relates to computer-automated mining and profiling server monitoring data and related information obtained through system commands and queries against particular software components arranged in a particular way that provides comparative information for the management and optimization of server and software resources through the identification of constraints and bottlenecks. Further, the present disclosure relates to the analysis and comparison of a current running profile of a server against previous or archived profiles. The profiles characterize the utilization and usage of server resources, or prior systems performance history for the purpose of performance tuning and resource optimization of the middleware messaging software.

BACKGROUND OF THE DISCLOSURE

Current software engineering practices require the ongoing monitoring and management of hardware and software assets. Hardware assets may include servers, workstations, routers, and other networking equipment. Software assets may include enterprise applications, desktop applications, middleware applications, etc. Previous solutions involve manual review of server statistics, creation of server and middleware software monitoring scripts, or the purchase of software licenses for monitoring and management software packages. These software packages are designed for a particular technical platform (i.e., a specific hardware and software architecture) and are constrained to a particular hardware and software environment requiring multiple software packages to cover a heterogeneous server environment. If changes are made to the hardware software architecture, the prior art software packages may not be sufficient to provide the same level of services. By contrast, the present disclosure provides a comprehensive solution.

IBM's WebSphere MQ™ ("MQ") is the industry leader for middleware messaging software, and there are a considerable number of software programs available for measuring and monitoring the product and its use of server resources. But these mechanisms reside at or operate on the end points (i.e., a specific node in the hardware and software architecture where applications are getting and putting messages to the MQ interface, a software platform or networking equipment where Queue Managers are communicating with each other, security monitoring interfaces, etc.) as used herein a Queue Manager provides queuing services to applications and manages the queues that belong to them. In some situations, the application is informed that this cannot be done, and appropriate reason code is given. But there is not presently any tool that measures the capacity of the MQ infrastructure.

There are not too many ways MQ infrastructures can be implemented, but the number of different physical components that make up a physical infrastructure can be considerable, especially with larger implementations, from physical or virtual server hardware and configuration, through to all the components that make up a middleware messaging network. So being able to quantify the capacity of a particular implementation is critical as not two implementations will be exactly the same. And there is no single tool out there today that provides the needed collection and analysis able to quantify the actual middleware messaging capacity.

BRIEF SUMMARY OF THE DISCLOSURE

One embodiment of the present disclosure may be described as a system for monitoring a performance of a computer network architecture. The system may comprise a plurality of collection points located throughout messaging endpoints in the computer network architecture. The collection points may be configured to collect operating system resource data and middleware data. The collection points may be implemented in software and are may be to execute at each messaging endpoint.

The system may further comprise a centralized harness service in electronic communication with the plurality of collection points. The harness service may be configured to receive and compile operating system resource data and middleware data from the plurality of collection points. The operating system resource data may comprise CPU, disk, or memory usage. The middleware data may comprise message counts, enqueue rates, or dequeue rates. The centralized harness service may be configured to send a specified number of messages at a specified size over a specified number of threads through the computer network architecture. The collection points may be configured to receive messages from the centralized harness and reply to the centralized harness. The messages and replies may be encrypted.

The system may further comprise a runtime data capture service in electronic communication with the harness service. The runtime data capture service may be configured to receive the compiled operating system resource data and middleware data. The runtime data capture service may also be configured to store the compiled operating system resource data and middleware data in a data repository.

The system may further comprise a graphical user interface in electronic communication with the data repository. The graphical user interface may be configured to retrieve system resource data and middleware data from the data repository, analyze the retrieved system resource data and middleware data, and display the analyzed system resource data and middleware data to a user.

The system may further comprise a collection rules engine configured to instruct each collection point on how it collects operating system resource data and middleware data.

Another embodiment of the present disclosure may be described as a system for monitoring a performance of a computer network architecture. The system may comprise a multi-threaded controller configured to produce messages, request messages, consume messages, and subscribe to queue managers.

The system may also comprise a multi-threaded trigger monitor configured to dynamically execute one or more consumer classes. Each consumer class may be configured to consume messages, generate reply messages, and introduce a delay between the consumption of a message and the generation of a reply message.

The system may also comprise a multi-threaded message publisher configured to publish multi-topic messages at a predetermined publishing rate. The message publisher may be configured to publish multiple types of message with various topics. The messages may be persistent or non-persistent messages.

The system may also comprise a scenario database in communication with the controller, trigger monitor, and message publisher, the database configured to provide each of the controller, trigger monitor, and message publisher with one or more test parameters. The scenario database may provide the controller, trigger monitor, and message publisher with updated test parameters and wherein the analysis engine also compares performance analysis data based on the updated test parameters.

The system may also comprise a runtime data capture service in configured to receive operation data from the controller and store the operation data in a data repository.

The system may also comprise an analysis engine configured to produce and monitor performance analysis data relating to the computer network architecture based on operation data in the data repository. The analysis engine may also be configured to record and manage test cycles and provide configurations for each test cycle. The analysis engine may also compare performance analysis data to previous scenarios.

Another embodiment of the present disclosure may be described as a method for determining a performance indicator of a computer network architecture. The method may comprise providing a load configuration to a centralized harness service based on a usage pattern for the computer network architecture; transmitting, from the centralized harness service to a plurality of collection points, one or more messages based on the provided load configuration; receiving, at the centralized harness service from the plurality of collection points, responses to the one or more messages, the responses containing performance results; storing, at a data repository, the received performance results; and determining, using a processor, the performance indicator of the computer network architecture and displaying the performance indicator to a user through a graphical user interface.

The present disclosure relates to the profiling of server system and middleware messaging statistics for performing system infrastructure performance analysis for quantifying capacity of a given configuration and combination of technical components. As used herein, middleware may describe computer software that provides services to software applications beyond those available from the operating system. Middleware may also describe the software layer that lies between the operating system and the applications on each side of a distributed computer network. Typically, middleware supports complex, distributed business software applications.

The present disclosure analyses a specific computer middleware messaging configuration and provides a unique combination of information to facilitate rapid correction or modification of technical components to optimize server transaction performance. Furthermore, the present disclosure's collection of server and transaction statistics provides users with a longer term ability to analyze server utilization and capacity metrics for maximizing server software asset investments and minimizing use of software resources which can help users to save money from over-buying on server capacity.

The present disclosure may be used for the discovery and implementation of middleware performance management. In one embodiment, the present disclosure can generate metrics that will be collected to provide performance and capacity planning data for interrogation and analysis by middleware technicians responsible for performance tuning of the middleware software assets to achieve cost savings of software licenses where a reconfiguration or tuning may be able to free up under-utilized resources.

This disclosure provides a platform-agnostic utility for the collection and management of performance data across heterogeneous systems. One problem solved by the present disclosure is simplifying the viewing and collection of performance management and monitoring information in a way that combines server level, system level, and software/application middleware level data so that capacity and utilization information can be more quickly analyzed and managed.

Embodiments usable within the scope of the present disclosure relate to computer-implemented methods and systems for transforming raw data (e.g., data that is not readily readable and/or understandable by an individual) associated with one or more capture files obtained from servers across the network, to form an array or similar individual readable data (e.g., data readily readable and understandable by an individual) usable for monitoring, analyzing, modifying, optimizing, or otherwise changing or observing the server topology, thereby enabling parallel analysis for a plurality of technical platforms. For purposes of this disclosure, the term "technical platforms" includes Linux & AIX—using Nmon™, Windows using Perflvlon™, z/OS using a straight dump to the Java™ directory structure, and Java™ for facilitating platform agnostic installation and configuration. The present disclosure is able to aggregate data from the collective technical platforms assimilating the data to a single repository in a way that is unique for each platform structure, but yet in a format consistent for interrogation, analysis, and improved usability.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

One embodiment of the present disclosure is the "MQPPM" performance pack. The embodiment MQPPM is a performance analysis tool, implemented in software, that is used to measure possible performance scenarios for the purpose of selecting a certain configuration that optimizes system resources for the particular pattern of usage. MQPPM also utilizes a suite of graphical user interface views to display data, including analyzed data.

MQPPM creates and configures reusable processes for modeling and measuring current and peak potential performance of a particular installation of MQ. The MQPPM pack comprises various software routines to enable this functionality. MQ may be used to decouple otherwise highly coupled and highly dependent software transaction processing into asynchronous application messages. The asynchronous application messages can be delivered to a receiving application through a standardized interface with configurable frequency. Other data delivery attributes can be communicated, which are characterized by specific Message Patterns, all of which can be modeled and measured by MQPPM.

MQPPM may be designed to exercise a MQ infrastructure by running end-to-end transactions of a particular model through MQ, be it from the furthest end points of the infrastructure, or selected segments.

Figure 1:
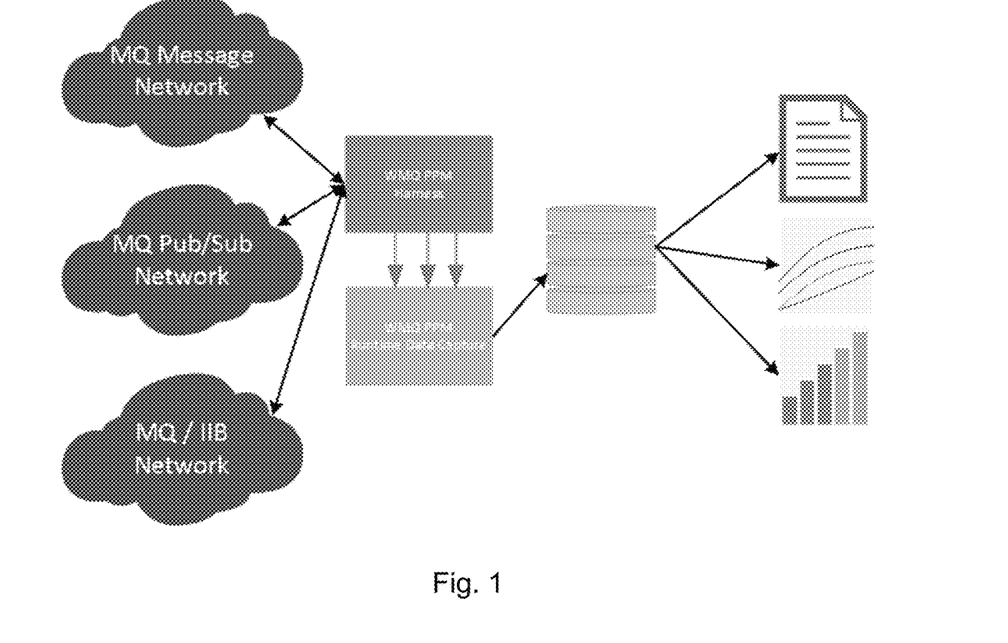
FIG. 1 is a diagram illustrating collection points located in the "clouds" of heterogeneous networks that originate middleware messages.
Figure 2:
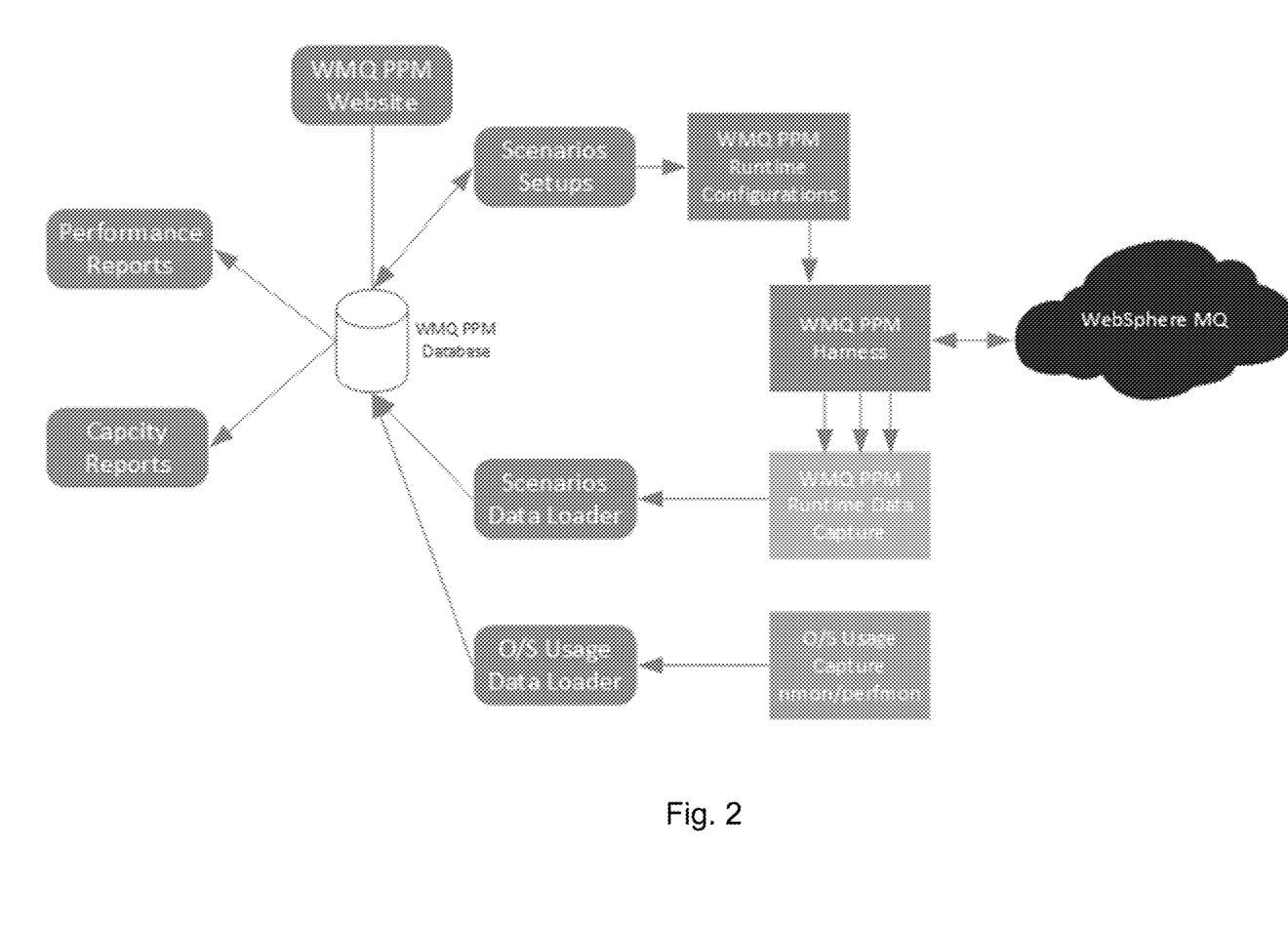
FIG. 2 is a diagram illustrating one embodiment of the present disclosure.

FIG. 1 shows the collection points or end points located in the "clouds" of heterogeneous networks are where middleware messages originate. These end points are also where agent components reside to produce statistics and information regarding the operating system resources (for example, CPU, disk, and memory usage) as well as querying and collecting middleware statistics (such as message counts, enqueue and dequeue rates, etc.). The collected information and middle ware statistics may be configured in a collection rules engine. The configuration may be performed before or after commencement of MQPPM. Information is collected and forwarded by the agent components to a centralized service (hereafter referred to as the "WMQ PPM Harness"). The harness transforms and passes the collected data to another service (hereafter referred to as the "WMQ PPM Runtime Data Capture") which receives data and writes it to the central data repository in the common format. From there, data is stored until it is needed for analysis or reporting by the user console. The collection of data is a one-way flow from collection point to the data repository. Data collection may be optimized for environments with high frequency and potentially large file data collection.

MQPPM may exercise the MQ infrastructure in a measurable and quantifiable manner. MQPPM can perform this in a variety of ways. For example, the WMQ PPM harness may send a specified number of messages at a specified size over a specified number of threads through the MQ infrastructure to a "U-Turn" Queue that returns messages to the sending thread. The elapsed time for each message on each thread may be captured in milliseconds. By performing a variety of these tests between various endpoints, with various message sizes, and over a varied number of threads, these metrics can profile the capacity and performance of the MQ infrastructure for the specified message sizes and volumes. In another example, MQPPM may simulate a request/response type application pattern. In this example, the WMQ PPM harness sends a specific size message to a responding Trigger Process that will reply with its' specified message size. By performing a variety of these tests between various endpoints, with various message sizes, and over a varied number of threads, a possible TPS can be determined.

One embodiment of MQPPM comprises the following steps: Providing selected load options based on the usage pattern defined for a particular MQ infrastructure implementation; driving the selected load options and capturing transaction performance results; and loading performance results to the MQPPM database and producing reports.

Where environments include usage of IBM's WebSphere Message Broker/IBM Integration Bus, MQPPM is able to deploy fixed WMB/IIB Message Flows to the product stacks and exercise MQ as well as the WMB/IIB software to message capacity and system utilization. This scenario could be done in two stages; $1^{st}$ capture the MQ infrastructure capacities; $2^{nd}$ exercise the WMB/IIB infrastructure by using these predefined Message Flows. The two scenarios will reflect the overall capacity of the MQ and WMB/IIB infrastructure and form a baseline for any tuning opportunities.

MQ also includes various security options such as SSL encryption between client applications and the MQ Queue Manager, SSL encryption between Queue Managers across the network, and Advanced Message Security (AMS). Use of these additional security features can add significant latency to round trip transaction response time, though generally transparent to application producers and consumers.

A Queue Manager ensures the following actions: object attributes the change according to the commands received, special events such as trigger events or instrumentation events are generated when the appropriate conditions are met, and messages are put on the correct queue, as requested by the application making the put call. Each queue belongs to a single Queue Manager and is said to be a local queue to that Queue Manager. The Queue Manager to which an application is connected is said to be the local Queue Manager for that application. For the application, the queues that belong to its local Queue Manager are local queues.

Associated with each Queue Manager is a set of attributes (or properties) that define its characteristics. Some of the attributes of a Queue Manager are fixed when it is created; others may be changed by using the WebSphere MQ commands. Inquiries can be made regarding the values of all the attributes, except those used for Secure Sockets Layer (SSL) encryption. The fixed attributes may include: The name of the Queue Manager, the platform on which the Queue Manager runs (for example, z/OS®), the level of system control commands that the Queue Manager supports, the maximum priority that can be assigned to messages processed by the queue manager, the name of the queue to which programs can send WebSphere MQ commands, the maximum length of messages the Queue Manager can process, and whether the Queue Manager supports syncpointing when programs put and get messages. Syncpointing is used to commit recoverable resources used by a Queue Manager. The changeable attributes may include: a text description of the Queue Manager, the identifier of the character set the Queue Manager uses for character strings when it processes calls, the time interval that the Queue Manager uses to restrict the number of trigger messages, the time interval that the Queue Manager uses to determine how often queues are to be scanned for expired messages, the name of the Queue Manager's dead-letter (undelivered message) queue, the name of the Queue Manager's default transmission queue, the maximum number of open handles for any one connection, the enabling and disabling of various categories of event reporting, and the maximum number of uncommitted messages within a unit of work.

A remote queue is a queue that belongs to another queue manager. A remote queue manager is any queue manager other than the local queue manager. A remote queue manager can exist on a remote machine across the network, or might exist on the same machine as the local queue manager. WebSphere® MQ supports multiple queue managers on the same machine.

MQPPM can quantify use of MQ AMS features and added latency for what the differences are between models for capacity, response times and systems utilization for encrypted as well as for non-encrypted messaging is in a particular environment. In one embodiment, MQPPM will perform capacity tests before MQ AMS is enabled and then run perform subsequent capacity tests post AMS enabling.

The MQPPM may be comprised of various software components. These components include, but are not limited to, a Controller, a Trigger Monitor, a Message Publisher, and a Configuration/Analysis Presentation.

The Controller is a configurable multi-threaded engine. The Controller can produce messages, request/consume messages, and subscribe to queue managers.

The Trigger Monitor may be multi-threaded and configurable. The Trigger Monitor may be programmed to dynamically execute required consumer classes. The consumer classes may be configured to simply consume messages. The consumer classes may also consume messages and generate reply messages. In some configurations, the consumer class may have a delay between consuming a message and generating a reply message in order to better simulate actual application processing time.

The Message Publisher may be multi-threaded and configurable. The Message Publisher can be configured to publish multi-topic messages (or multiple types of messages with various topics). The Message Publisher can also be configured to have a predetermined publishing rate.

The Configuration/Analysis Presentation ("Presentation") may be an Oracle XE web-based application. The Presentation may record customer/test cycles, manage test cycles, provide configurations for each of the components for each test run, load test results, and produce performance analysis charts.

Various test scenarios can be implemented using the systems and methods of the present disclosure. For example, some test scenarios include put and get rate testing, request/response testing, and publish/subscribe testing.

Generally, the put and get rate testing quantifies the put and get rates of the MQ Queue Managers. Test results can be mapped according to message size for example, 1 KB, 10 KB, 50 KB, 100 KB, 250 KB, 500 KB, etc. The test can also be baselined by volume capacity under multi-thread control. The test can also be baselined by customer messages sizes. In this way, the message size may be chosen for the average message size and type per an application stack.

Generally, the request/response testing quantifies network/MQ rates. In one embodiment, the testing is performed using a "U-Turn" remote queue. The "U-Turn" Queue is simply a Remote Queue on the target MQ Queue Manager ("QMgr") that will route the message back to the sending QMgr. This pattern can be used to assess portions of or the whole of an MQ infrastructure. The request/response testing also simulates customer application response. For example, the test scenario may run a trigger monitor with customer average response times.

Generally, the publish/subscribe testing performs a variety of different use case implementations. For example, the publish/subscribe testing may involve single topic publish and subscribe with message sizes at 1 KB, 10 KB, 50 KB, or 100 KB. The testing may involve single topic publishing and multiple subscribers at similar message sizes. The testing may involve multiple topic publishing and multiple subscribers at similar message sizes.

In one exemplary embodiment, the MQPPM pack is restricted to the following Message Patterns:

1. Put a Message to a Queue (including, but not limited to: Simple Put to a Local Queue, Simple Put to a Remote Queue, Multi-threaded Put to a Local Queue, and Multi-threaded Put to a Remote Queue);

2. Get a Message from a Queue (including, but not limited to: Simple Get from a Local, and Multi-threaded Get from a Local Queue);

3. Request/Response (including, but not limited to: Simulated Request/Response using a U-Turn Queue, Simulated Request/Response using an MQ Triggered Process response); and 4. Publish/Subscribe These message patterns are useful to assess and characterize specific end-to-end performance characteristics of a particular QMgr and MQ infrastructure. An application has two core interactions with a QMgr—namely, Put and Get actions. Assessing, analyzing, and characterizing these two actions is fundamental to understanding health and performance tuning of a QMgr and the MQ infrastructure.

MQ provides two types of message persistence for managing messaging in the synchronous and asynchronous messaging paradigms.

Persistent Messages—Persistent messages are used for flows that are dependent on the MQ feature for guaranteeing "one-time assured delivery" of application messages between application end points (guaranteeing a message is sent successfully from application A to application B without error, message loss, or sending of duplicate messages).

Non-Persistent Messages—Non-persistent messages are high speed messages that are used in Request/Reply paradigms, as this message handling option is memory bound and reduces the amount of I/O required for the hosting systems for writing messages to disk. Such messages do not typically survive a system restart but pass through the system at much higher speeds than persistent messages.

The present disclosure can assess a QMgr and MQ infrastructure in many ways. One test involves adding Put Message to a Queue. The Put Message action evaluates how quickly a QMgr will accept messages. There are additional variables that can impact the model that need to be taken into account when testing the performance of a QMgr accepting messages. For example, whether the target Queue is Local or Remote, and whether the messages Persistent or Non-Persistent, the MQPPM performance pack can model the performance and capacity differences.

To fully assess capacity and performance of a QMgr and the MQ infrastructure involves multiple test runs to model and isolate issues that are detected. Many methods may be deployed simultaneously or sequentially. One such method puts messages to a Local Queue and will be used assess the QMgr and O/S set up configurations. Because messages would not be leaving the local server (with Local Queues), there is no network configuration and latency involved.

Another method involves putting messages to a Remote Queue to assess conditions external to the QMgr and O/S set up and configuration. Generally, the Remote Queue will be hosted in another QMgr on a different host and involve the use of the network for messages to be put there.

In the present disclosure, agent components forward data to be deposited in the database. The key looping components of the life cycle are the test/modify/re-test portion for tuning the combination hardware/software stack where the performance statistics are re-collected and compared to previously captured profiles (See FIG. 1).

In one embodiment, MQPPM components are written in Java for portability and usability across multiple platforms. The components may include:

Load Driver Process Component (hereafter "Load Driver"). The Load Driver is configurable for the number of active threads, message size number of messages, etc. The Load Driver will capture the elapsed time for each message transaction in milliseconds and report all runtime statistics to a log file. The log file is then processed with the appropriate statistics extracted and performance charts produced.

Trigger Monitor Process Component (hereafter "Trigger Monitor"). The Trigger Monitor is a custom Java™ trigger monitor supporting the Request/Response flow tests. The Trigger Monitor is configuration and is a production ready process.

Publish/Subscriber Processes Component (hereafter "Publish/Subscriber"). The Publish/Subscriber support both JMS and native MQ Java processing. The Publisher processes are configurable for multi-threaded publishing and message sizes. Log files for both the Publisher and Subscriber processes contain statistics showing both the Publisher and Subscriber capacities and performance.

Exemplary Performance Reports: Capturing system utilization using tools like nmon for Linux and AIX and Perfmon for Microsoft platforms can be used. (See FIG. 3, the sample chart shows CPU utilization for a test cycle of 100 threads and a message size of 100 Kb.) We can see the test cycle has run 4 times; the very first peak of each run is the load process building the 100 Kb message with the rest of the time be taken by the QMgr of O/S.

Figure 3:
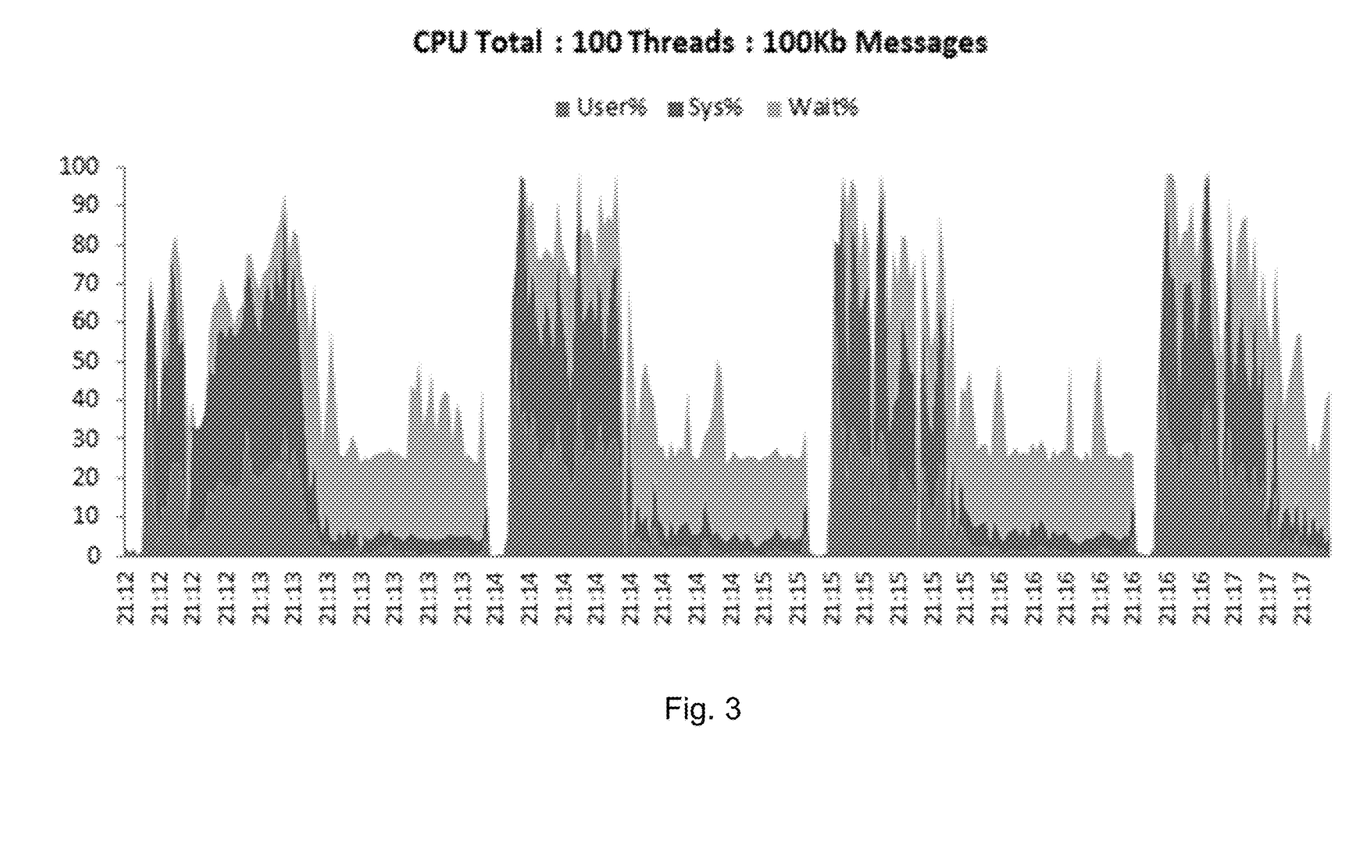
FIG. 3 is a chart showing CPU utilization for a test cycle of 100 threads and a message size of 100 Kb.

There is an excess CPU Wait time showing the limitations of this QMgr/platform configuration is I/O. But looking at the previous TPS chart we can see that the TPS was actually a well sustained 1,466 TPS.

Figure 4:
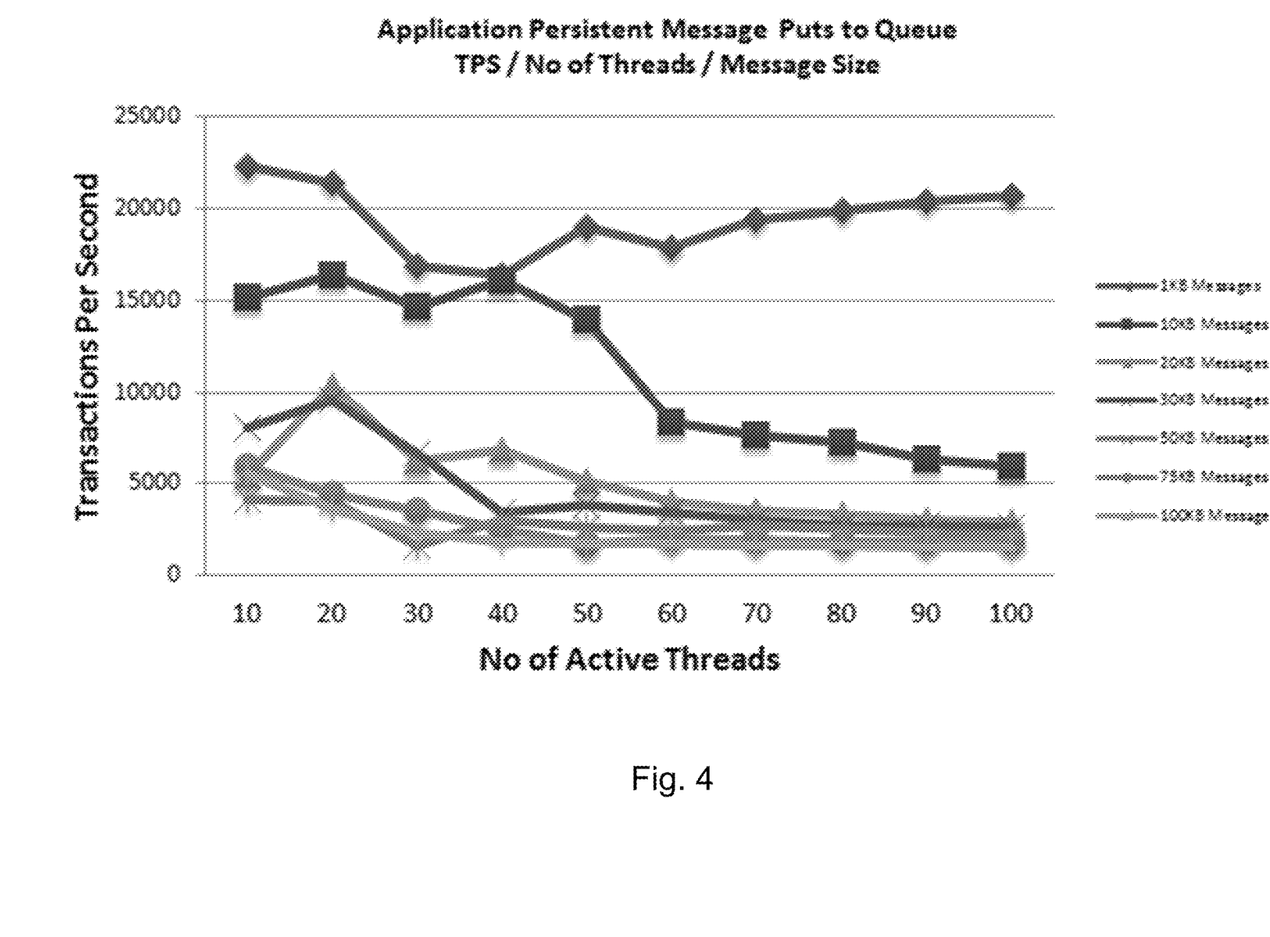
FIG. 4 is a chart showing transactions per second (TPS) which illustrates messaging capacity based on the number of transactions by number of threads and message size for putting messages to a local queue.

FIG. 4 is a sample TPS (Transactions Per Second) chart showing messaging capacity based on the number of transactions by number of threads and message size for putting messages to a local queue. This chart indicates the expected performance figures for this QMgr on a particular platform.

The 1 KB messages has a very high TPS, starting at 22,000 for 10 threads, dropping to 16,000 TPS at 40 threads but going back up to 20,000 TPS at a 100 threads.

All the other message sizes drop from their start positions with the 100 KB messages having a very steady through put from 40 to 100 threads and only a slow drop off in TPS from 1,836 to 1,466.

The collection of components together will deliver the means to collect server and middleware software performance statistics together, place them in a database, and provide views and management consoles that will facilitate middleware performance tuning and management of these technical assets.

Furthermore, the performance dashboard views can be customized so that the viewers of the information do not require training to apprehend the significance of the information.

The disclosed software may leverage the following features: Standard installer—will pull from archive and perform appropriate unattended installation steps into the designated server directory to facilitate automated installation of required software components.

Additionally, for purposes of the disclosure and claims herein, the term "array" can be synonymously used with the term "individual readable data," to indicate any form, organization, or type of information that can be readily understood and processed by an individual without requiring significant additional transformation thereof.

Systems and methods of the present disclosure will be implemented using the Java™ programming language on any Java™ supported computer or similar device. In one embodiment, raw data associated with one or more captured files is received, the raw data including metrics associated with respective capture files. The raw data is transformed to form an array or similar individual readable data that associates each capture file with one or more respective metrics. The agents capture each unique data point (not deltas), measuring in milliseconds. Because we can run in a multi-threaded environment, agents are able to capture both the message and the return response on the same thread saving considerable system overhead for the monitoring capability compared to competitive solutions.

For example, a plurality of capture files may be received from various agent components, each at a respective point in time. The data will be sent across the network to a collector component that will write the data to the repository for long-term storage of data for historical reporting. After transformation of the data into a human readable format, the resulting output (from the end collection points) each being associated with a single capture file, with respective key metrics, in the form of columns, thereby defining cells, each cell populated by a value associated with the key metric noted by the column heading.

The data structure used for the disclosure is a relational model using entities that are within the collection structure are used to provide the profiles, patterns, and usage charts based on the particular usage pattern and related attributes. The collection data itself is used to produce the profile information for analysis. Depending on the usage of the embodiment, each scenario may have unique data retention needs, for example, capturing and uploading data to a website for ongoing reporting, may involve regular data purging from the source data repository. In such a situation, the disclosure will include an archival facility for the purpose of being able to restore past collection, analysis, and profile generation.

A webapp may be used to register a customer and then derive the required tests. For each test, the website will generate the runtime configuration information that the user would download and put into the configuration directory. The harness would then use this configuration to run the test.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A system for monitoring a performance of a computer network architecture comprising:
    a multi-threaded controller configured to produce messages, request messages, consume messages, and subscribe to queue managers;
    a multi-threaded trigger monitor configured to dynamically execute one or more consumer classes;
    a multi-threaded message publisher configured to publish multi-topic messages at a predetermined publishing rate;
    a scenario database in communication with the controller, trigger monitor, and message publisher, the database configured to provide each of the controller, trigger monitor, and message publisher with one or more test parameters;
    a runtime data capture service in configured to:
        receive operation data from the controller; and
        store the operation data in a data repository; and
    an analysis engine configured to produce and monitor performance analysis data relating to the computer network architecture based on operation data in the data repository.

2. The system of claim 1, wherein a consumer class is configured to consume messages, generate reply messages, and introduce a delay between the consumption of a message and the generation of a reply message.

3. The system of claim 1, wherein the message publisher is configured to publish multiple types of message with various topics.

4. The system of claim 1, wherein the analysis engine is also configured to record and manage test cycles and provide configurations for each test cycle.

5. The system of claim 1, wherein at least some of the messages are persistent messages.

6. The system of claim 1, wherein at least some of the messages are non-persistent messages.

7. The system of claim 1, wherein the scenario database provides the controller, trigger monitor, and message publisher with updated test parameters and wherein the analysis engine also compares performance analysis data based on the updated test parameters.

8. The system of claim 1, wherein the analysis engine compares performance analysis data to previous scenarios.

* * * * *